United States Patent [19]

Darbonne

[11] Patent Number: 5,702,750

[45] Date of Patent: Dec. 30, 1997

[54] METHOD FOR PROCESSING FRESH PLANTS TO BE STORED BETWEEN LOW POSITIVE AND NEGATIVE TEMPERATURES

[75] Inventor: Luc Darbonne, Milly la Foret, France

[73] Assignee: Societe de Developpment de L'Industrie Agro-Alimentaire et de la Pepiniere Europeenne - Sodiape, Bagneau Sur Loing, France

[21] Appl. No.: 536,802

[22] Filed: Sep. 29, 1995

[30] Foreign Application Priority Data

Sep. 29, 1994 [FR] France ................... 94 11654

[51] Int. Cl.$^6$ .................... A23B 7/024; A23B 7/08
[52] U.S. Cl. .............. 426/615; 426/304; 426/384; 426/385
[58] Field of Search ..................... 426/615, 304, 426/323, 384, 385

[56] References Cited

U.S. PATENT DOCUMENTS 3,188,750 6/1965 Davis et al.
4,970,089 11/1990 Jacobellis .................... 426/384
5,397,584 3/1995 Aung et al. .................. 426/638

FOREIGN PATENT DOCUMENTS

| 2 629 104 | 9/1989 | France. |
| 2 638 062 | 4/1990 | France. |
| WO-A-86 01686 | 3/1986 | WIPO. |

*Primary Examiner*—Helen Pratt
*Attorney, Agent, or Firm*—Hill, Steadman & Simpson

[57] ABSTRACT

The invention relates to a method for processing freshly picked plants, and more particularly aromatic herbs or plants, characterized in that it comprises steps consisting in adding water activity depressors to consumable pieces of plants and mixing them; deep-freezing the resulting mixture; extracting from such mixture an amount of water determined by sublimation and stopping the process at the very beginning or during progress of the primary desiccation, so that such mixture has dry and/or still frozen or more or less moist pieces of plants; homogeneously mixing the resulting mixture of pieces of plants so as to allow for a migration of water from the frozen pieces towards the more or less moist pieces and/or the dry pieces.

32 Claims, No Drawings

METHOD FOR PROCESSING FRESH PLANTS TO BE STORED BETWEEN LOW POSITIVE AND NEGATIVE TEMPERATURES

The present invention relates to vegetable products, in particular aromatic herbs or plants which can be stored equally well at low, positive or negative temperatures, the taste, aroma, colour, texture and flexibility of such vegetable products being preserved. The invention also relates to a method for processing freshly picked plants and more particularly aromatic herbs and plants to obtain such vegetable products.

Most freshly picked plants are available in definite seasons and within a limited geographical area only. Their storage life is short, in particular when they are cut into ready-for-use pieces. They are subject to microbiological degradations, quick adulteration of aroma and colours mainly caused by enzymes. They wither and their texture is modified.

Such ready-for-use plants are also likely to cake because of their high water content.

To remedy these drawbacks, various preservation modes have been developed to have ready-for-use plants available all year around, while trying to preserve some of their properties. In addition to classical techniques, many methods for the preservation and storage of vegetable products over short and long periods have been developed for the last few years.

Reference can be made, for instance, to documents FR-A-2 629 104 disclosing a complete hot air dehydration of foodstuff; U.S. Pat. No. 3,188,750 disclosing a drying technique which combines lyophilization and hot dehydration to obtain a highly dehydrated product; WO 86/01686 disclosing a method for obtaining an intermediate moisture plant conditioned under controlled atmosphere, so as to be stored in a deep-freezer; FR-A- 2 638 062 disclosing a method for hot air dehydration under a vacuum.

However, all the plants obtained by means of prior art techniques raise some problems or their use is somewhat limited.

Thus, individually deep-frozen plants have the same taste, colour and aroma as fresh plants but must be kept frozen at a negative temperature, which makes them breakable and friable. When at a positive temperature, they rapidly suffer enzymatical deteriorations which result in a loss in freshness and in the appearance of unpleasant taste and smell and in modifications in colour. Exudates, caking and softening also appear.

The main drawback of hot air dehydrated plants is that they lose gustative properties. Thus, in most cases, they taste hay and aroma has almost disappeared. Colours are much adulterated and unattractive and this is all the truer as plants are sensitive to enzymatical oxidations and to heat. The plants structure is completely changed as cells split and their shape is contracted (loss in volume). Finally, their mechanical properties are no longer satisfactory, they crumble, at least partly, under the action of the unavoidable frictional forces which apply when they are handled which results in powder rarely desired in cooking. Although lyophilised plants have a hardly reduced apparent volume and although they do not suffer enzymatical deteriorations when being dehydrated, the same drawbacks as those mentioned above for dehydrated products can be found.

Besides, drying times are very long and entail an excessive and expensive power consumption.

More particularly, it is an object of the present invention to provide for a method for processing freshly picked plants, wherein plants are not damaged, bruised, or mashed.

It is another object of the present invention to provide for a ready-for-use vegetable product—i.e. which requires no rehydration before use—, which requires no subsequent cutting, which can be stored at a low positive temperature for several days without caking, without exudating, without sticking, and without softening.

It is another object of the present invention to provide for a ready-for-use vegetable product, the structure, colour, texture, aroma and taste of which are durably preserved.

It is another object of the present invention to provide for a vegetable product whose aspect is close to that of a fresh product, and different from that of a deep-frozen, dehydrated and lyophilised product.

It is another object of the present invention to provide for a vegetable product which can be used similarly to a fresh vegetable product.

It is another object of the present invention to provide for a vegetable product the above-mentioned properties of which are preserved at temperatures higher or lower than 0° C., which allows it to be stored equally well at low, positive or negative temperatures, in a refrigerator or a freezer.

It is another object of the present invention to provide for a vegetable product which can be stored for up to thirty days at refrigerating temperatures only, and for up to four years at the deep-frozen food storage temperatures, or at combined storage temperatures for up to four years at the deep-frozen food storage temperatures and then for up to thirty days at refrigerating temperatures.

Therefor, the invention related to a method for processing freshly picked plants, and more particularly aromatic herbs or plants, characterised in that it comprises the following steps, which consist in:

a) adding water activity depressors to consumable pieces of plants and mixing them;

b) deep-freezing the resulting mixture;

c) extracting from such mixture a comprehensive amount of water which is determined by sublimation by stopping the primary desiccation process in progress, or stopping the very beginning of the secondary desiccation, such mixture being likely to have dry and/or still frozen or more or less moist pieces of plants;

d) homogeneously mixing the resulting mixture of pieces of plants so as to allow for a migration of water from the frozen pieces towards the more or less moist pieces and/or the dry pieces;

e) collecting the resulting ready-for-use plants, since their aspect, aroma, taste, colour and flexibility are similar or close to those of fresh plants.

Surprisingly, this processing method makes it possible to obtain a vegetable product having the same properties as fresh plants. In fact, sublimation best preserves the structure properties and prevents any enzymatical adulteration but is not strong enough for eliminating aromatic complexes. Besides, thanks to the combined action of a reduced water content and water activity depressors, such properties are preserved when the product is stored at deep-frozen product storage temperatures as well as at refrigerating temperatures. Such properties are, in particular, organoleptic properties such as taste and smell (certified by the essential oils content measurements and by a tasting jury) and colorimetric properties:colour (certified by colorimetric measurements).

During a storage at refrigerating temperatures, the reduction in the moisture content prevents exudation, caking, sticking and softening of plants. The moisture content remains high enough for the plant to have a moist appearance like fresh plants.

The invention also concerns a vegetable product, more particularly an aromatic herb or plant, to which water activity depressors of the mineral salts and/or glucids type have been added, and which has been submitted to water extraction, after being deep-frozen, so as to have water activity at 20° C. and a mineral salts content, a glucids content and a moisture content within an interval such that said product's properties remain similar to those of fresh products or close to them, more particularly as far as texture, flexibility, organoleptic and colorimetric properties are concerned, and that it can be stored equally well at low, positive or negative temperatures.

Other characteristics and advantages of the present invention will become apparent when reading the following description.

The invention relates to a method for processing freshly picked plants and more particularly aromatic herbs and plants. The plants which are likely to be processed by the method of the present invention are dill, basil, celery, chervil, coriander, watercress, spinaches, tarragon, lovage, marjoram, mint, sorrel, parsley, rosemary, savory, sage, oregano, lavender, chive, garlic shallot, onion, courgette, leek, bean, sweet pepper, etc. and this list is not exhaustive.

The method according to the present invention substantially comprises four steps.

The first step consists in adding water activity depressors to consumable pieces of plants and mixing them.

In the present invention, the term "pieces" also includes the alternative solution which consists of the case when several homogeneous plants are mixed together.

According to the invention, the consumable pieces of plants can also be previously deep-frozen. Deep-freezing can be carried out using known techniques such as the passage in a cold chamber or in a deep-freezing tunnel, and the use of liquid nitrogen or a lyophilisation cell.

Water activity depressors can be liquid or solid.

In this last case, the temperature at which water activity depressors are, added is the temperature required for their solubilisation by migration of water to the outside of the vegetable structure. In such a case, it ranges from –40° C. to 30° C., and more particularly from –8° C. to 10° C.

The amount of water activity depressors added to and mixed with the vegetable product to be processed is such that the composition of the plant obtained upon completion of the method according to the present invention comprises from 30% to 55% of water, from 8% to 55% of water activity depressors and that the water activity at 20° C. ranges from 0.60 to 0.80 and preferably from 0.70 to 0.75.

According to a preferred embodiment of the invention, the amount and nature of water activity depressors are selected so that the content of the resulting plants range from 8% to 30% as regards mineral salts and 5 to 25% as regards glucids.

As for the nature of water activity depressors, it is closely linked to the nature of the processed vegetable product. Such water activity depressors can be selected from the group comprising: mineral salts, and in particular sodium chloride, calcium chloride, potassium chloride, sodium citrate, food carbonates and sulphates; mono- , di- and oligosaccharides and in particular glucose, fructose, saccharose, lactose, maltose, malto-dextrins, glucose syrups; polyols and in particular D-sorbitol and glycerol; proteins and protein hydrolysates; and organic acids and/or salts thereof.

The second step of the method according to the invention consists in deep-freezing the mixture constituted of the consumable pieces of plants and of the water activity depressors. When deep-frozen pieces of plants are used from the start in the method of the present invention, this step is obviously not necessary.

Deep-freezing can be carried out using known techniques such as a cold chamber or a deep-freezing tunnel, liquid nitrogen or even a lyophilisation cell.

The next step of the method according to the invention consists in extracting a determined quantity of water from the deep-frozen mixture. This extraction is obtained through sublimation and the remaining fraction of water is preserved as ice or in a combined shape.

Sublimation is preferably carried out in a lyophilisator wherein the operating conditions are as follows, by way of illustration:

deep-freezing temperature: from around –20° C. to –0° C., vacuum lower than 4 mm Hg, calorie supply, considering that sublimation is an endothermic reaction: support of the product heated from 10° C. to 80° C., after the putting under a vacuum.

According to a significant feature of the invention, sublimation is stopped during the primary desiccation or at the very beginning of the secondary desiccation, since such mixture is likely to have dry and/or still frozen or more or less moist pieces of plants.

Such result is obtained, more particularly when sublimation is stopped at a determined time t so that the water content of the mixture globally reaches 30 to 55%. Such time is at least equal to half the time requested for a conventional sublimation followed by a conventional secondary desiccation, for a given product, and hence the energy cost is significantly reduced and efficiency is highly increased.

The fourth step of the method according to the present invention consists in homogeneously mixing the mixture of plant pieces resulting from the preceding step. Such a mixture makes it possible for still frozen or more or less moist pieces of plants to contact dry pieces, and thus allows for water to migrate through the pieces, such migration being necessary for obtaining pieces having similar composition and water content. Such migration is carried out at a positive or a negative temperature, that is higher than or equal to –20° C.

Processed plants are then collected. They are ready-for-use, that is they need no rehydration before use.

Thus they can be directly dredged as a partial seasoning of a course, for instance. Unlike the traditional dehydration methods, the essential oils content of processed vegetable products is at most reduced by 30% with respect to the dry matter of the fresh vegetable product.

The essential advantage offered by such product is that they can be stored at low positive temperatures and negative temperatures and thus at deep-frozen product storage temperatures as well as at refrigerating temperatures.

The method according to the present invention is either continuous or discontinuous. In such a case, it comprises a storage step at a temperature lower than or equal to –18° C. prior to the above-mentioned sublimation step.

Flavours and/or starches and/or taste intensifiers may initially be added to the freshly picked plants to be processed (which may then be deep-frozen).

Fresh plants can be blanched or previously blanched deep-frozen plants can be used.

The invention also concerns a vegetable product and more particularly an aromatic plant or herb to which water activity depressors of the mineral salts and/or glucids type have been added, and which has been submitted to water extraction, by sublimation stopped at a determined time t, so as to have water activity at 20° C., and a mineral salts content, a glucids content and a moisture content within an interval such that said product's properties remain similar to those of fresh products or close to them, more particularly as far as texture, flexibility, organoleptic and colorimetric properties are concerned, and that it can be stored equally well at low, positive or negative temperatures.

Advantageously, water activity at 20° C. ranges from 0.60 to 0.80 and preferably from 0.70 to 0.75; mineral salts content ranges from 8% to 30%; said glucids content ranges from 5% to 25% and said moisture content ranges from 30 to 55%.

Water activity depressors are selected from the above-mentioned group.

The vegetable product according to the present invention can also comprise flavours and/or starches and/or taste intensifiers.

Its storage temperature ranges from −40° C. to 12° C., more particularly from −18° C. to 6° C.

The invention will now be described using examples which are given for information only and must not be considered as limitations.

EXAMPLE N°1

600 g of basil flakes (containing 8% of dry matter) deep-frozen at −20° C. (according to the method disclosed in FR-B-2 665 612) are mixed with 32.14 g of sodium chloride and 16.20 g of saccharose. The products are intimately mixed for 8 minutes, during which time salt and sugar nuclei dissolve in the water extracted from the basil flakes surface. The mixture is then placed onto the lyophilisator plates and immediately frozen at −30° C. A vacuum is then maintained at $8.10^{-2}$ mbar and the plates are heated at 25° C. When the basil water has been sublimated for 5 hours, the total water content of the batch amounts to 41.5%. After mixing into a quick homogenisation, the batch is stored at +12° C. for 14 days. The taste, smell and colour are unchanged, and a 10-person tasting jury (according to standard NF V09-013) detects no significant difference between the basil on the day it was refrigerated and on the fourteenth day.

EXAMPLE N°2

600 g of parsley pieces (containing 12% of dry matter) deep-frozen at −20° C. are mixed with 44.4 g of sodium chloride and 22.2 g of saccharose.

The products are intimately mixed for 10 minutes, and stored in a cold room for 2 days prior to being placed in the lyophilisator. A vacuum is then maintained at $9.10^{-2}$ mbar and the plates are heated at 25° C. Upon completion of a 6 h 30 long sublimation, the total composition of the partly lyophilised parsley amounts to 32.8% of water, 34.9% of vegetable dry matter, 21.5% of sodium chloride, 10.8% of saccharose, and the water activity (Aw) amounts to 0.7.

After homogenisation, the batch is stored in a cold room at −20° C. for 7 days. A tasting jury judges the unchanged taste, smell and colour (according to standard NF V09-013).

EXAMPLE N°3

100 kg of basil (containing 12% of dry matter) are mixed with 12 kg of a saccharose/sodium chloride mixture. After solubilisation and solute impregnation, the product is deep-frozen at −25° C., and placed into a lyophilisation cell for sublimation purposes. A vacuum is then maintained at 0.4 mbar and the plates are heated at 20° C. Upon completion of a 13 h long sublimation, the composition of the homogenised basil amounts to 42.8% of H2O, 26.4% of herb dry matter, 14.5% of saccharose, 14.5% of sodium chloride, and water activity amounts to 0.75. The colorimetric measurement of the vegetable product measured with h° colour coordinates, with a Minolta apparatus (CR 310), ranges from 128.0 to 125.5 for the initial fresh plant and 131 for the deep-frozen plant. The original colour of basil is unchanged.

The essential oil content with respect to the vegetable dry matter (D.M.) amounts to 0.653 ml/100 g of vegetable dry matter, for fresh basil and 0.570 ml/100 g of dry matter for the resulting basil, which means that 87% of essential oils (the main components of aroma and taste) have been kept. Aroma is preserved and concentrated at 10.066 ml for 100 g of fresh basil and 0.15 ml for 100 g of the resulting basil, through the partial dehydration of the plant.

I claim:

1. A method for processing freshly picked plants comprising the following steps:
   (a) adding water activity depressors to consumable pieces of plants and mixing them to form a mixture, the resulting mixture having 8 to 55% of water activity depressors and a water activity at 20° C. ranging from 0.6 to 0.8;
   (b) deep-freezing the mixture;
   (c) extracting from the frozen mixture a predetermined total amount of water by a sublimation process having a primary desiccation and a secondary desiccation, by stopping the sublimation process during the primary desiccation or at the very beginning of the secondary desiccation until total water content of the mixture is between 30% to 55%, such mixture then having dry, still frozen and/or moist pieces of plants;
   (d) homogeneously mixing the mixture from which the predetermined total amount of water was extracted so as to allow for a migration of water from the frozen pieces of plants towards the moist pieces of plants and the dry pieces of plants;
   (e) collecting the pieces of plants from the homogeneously mixed mixture, wherein no rehydration step before use of the pieces of plants is required.

2. The method of claim 1, wherein the consumable pieces of plants to which the water activity depressors are added are previously deep frozen.

3. The method of claim 1, wherein the water activity depressors are added at a temperature within the range from −40° C. to 30° C.

4. The method of claim 3, wherein the water activity depressors are added at a temperature within the range from −8° C. to 10° C.

5. The method of claim 1, wherein the water activity depressors are added in an amount so that the resulting mixture pieces of plants have from 13% to 55% of water activity depressors and a water activity at 20° C. ranging from 0.70 to 0.75.

6. The method of claim 1, wherein the water activity depressors are added in an amount so that the resulting mixture pieces of plants have the following composition: from 8% to 55% of water activity depressors, and a water activity at 20° C. ranging from 0.60 to 0.80, and a mineral salt content on the order of 8% to 30% and/or a glucides content on the order of 5% to 25%.

7. The method according to any of claims 1, 2, 3, 4, 5, or 6, wherein the water activity depressors are selected from the group comprising mineral salts, saccharides, polyols, proteins and organic acids.

8. The method of claim 7, wherein the mineral salts are selected from the group consisting of sodium chloride, calcium chloride, potassium chloride, sodium citrate, food carbonates and sulphates.

9. The method of claim 7, wherein the saccharides are selected from the group consisting of monosaccharides, disaccharides and oligosaccharides.

10. The method of claim 7, wherein the saccharides are selected from the group consisting of glucose, fructose, saccharose, lactose, maltose, malto-dextrins and glucose syrups.

11. The method of claim 7, wherein the polyols are selected from the group consisting of D-sorbitol and glycerol.

12. The method of claim 7, wherein the water activity depressors are solid water activity depressors.

13. The method of claim 7, wherein the water activity depressors are liquid water activity depressors.

14. The method of claim 1, wherein an essential oils content of the resulting mixture is reduced at most by 30% with respect to a dry version of the fresh plant pieces.

15. The method of claim 1, wherein prior to the sublimation step, the plant pieces are subjected to a storage step at a temperature lower than or equal −18° C.

16. The method of claim 1, wherein the steps of the method are undertaken in a continuous manner.

17. The method of claim 1, comprising the further step of adding flavors, starches and/or taste intensifiers.

18. The method of claim 1, comprising the further step of blanching the plant pieces.

19. The method of claim 1, wherein the water activity depressors are added in an amount so that the resulting mixture pieces of plants have from 30% to 55% of water activity depressors and a water activity at 20° C. ranging from 0.60 to 0.80.

20. A method for processing freshly picked plants comprising the following steps:
(a) adding water activity depressors to consumable pieces of plants and mixing them to form a mixture, the water activity depressors being added in an amount so that the resulting mixture pieces of plants have the following composition: from 8% to 55% of water activity depressors, a water activity at 20° C. ranging from 0.60 to 0.80, and a mineral salt content on the order of 8% to 30% and/or a glucides content on the order of 5% to 25%;
(b) deep-freezing the mixture;
(c) extracting from the frozen mixture a predetermined total amount of water by a sublimation process having a primary desiccation and a secondary desiccation, by stopping the sublimation process during the primary desiccation or at the very beginning of the secondary desiccation until the examining water content of the mixture is between 30 to 55%, such mixture .then having dry, still frozen and/or moist pieces of plants;
(d) homogeneously mixing the mixture from which the predetermined total amount of water was extracted so as to allow for a migration of water from the frozen pieces of plants towards the moist pieces of plants and the dry pieces of plants;
(e) collecting the pieces of plants from the homogeneously mixed mixture, wherein no rehydration step is required before use of the pieces of plants.

21. A vegetable product which does not require rehydration for use but to which water activity depressors have been added, and which has been subjected to a water extraction process, after being deep frozen, so as to have water activity at 20° C. and a mineral salt content, a glucides content and a moisture content within an interval such that the product's properties are similar to those of fresh products and that can be stored equally well at low positive to negative temperatures, the water activity at 20° C. ranging from 0.60 to 0.80, the mineral salts contents ranging from 8% to 30%, the glucides content ranging from 5% to 25% and the moisture content ranging from 30% to 55%.

22. The vegetable product of claim 1, wherein the moisture content ranges from 30% to 55%.

23. The vegetable product according to claim 21, wherein its essential oils content is at most 30% less than that of dried versions of the fresh vegetable product.

24. The vegetable product according to claim 21, wherein the product includes added flavors, starches and/or taste intensifiers.

25. The vegetable product of claim 21, wherein the water activity at 20° C. ranges from 0.70 to 0.75.

26. The vegetable product of any one of claims 21 and 25, wherein the water activity depressors are selected from the group consisting of mineral salts, saccharides, polyols, proteins, protein hydrolysates and organic acids.

27. The vegetable product of claim 26, wherein the mineral salts are selected from the group consisting of sodium chloride, calcium chloride, potassium chloride, sodium titrate, food carbonates and sulphates.

28. The vegetable product of claim 26, wherein the saccharides are selected from the group consisting of monosaccharides, disaccharides and oligosaccharides.

29. The vegetable product of claim 26, wherein the saccharides are selected from the group consisting of glucose, fructose, saccharose, lactose, maltose, malto-dextrins and glucose syrups.

30. The vegetable product of claim 26, wherein the polyols are selected from the group consisting of D-sorbitol and glycerol.

31. The vegetable product of claim 21 wherein its storage temperature ranges from −40° C. to 12° C.

32. The vegetable product of claim 21, wherein its storage temperature ranges from −18° C. to 6° C.

* * * * *